US011956650B2

(12) United States Patent
Atkins et al.

(10) Patent No.: US 11,956,650 B2
(45) Date of Patent: *Apr. 9, 2024

(54) SYSTEMS AND METHODS FOR DETERMINING BASELINES FOR NETWORK PARAMETERS USED TO CONFIGURE BASE STATIONS

(71) Applicant: Verizon Patent and Licensing Inc., Basking Ridge, NJ (US)

(72) Inventors: Brandon Scott Atkins, Evans, GA (US); Timothy E. Coyle, Chicopee, MA (US); Lindsay M. Weinberg, Phoenix, AZ (US); Zachary Wozich, Casco, ME (US); Michael J. Schaafsma, Twin Lake, MI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,375

(22) Filed: Sep. 2, 2022

(65) Prior Publication Data

US 2022/0417770 A1 Dec. 29, 2022

Related U.S. Application Data

(63) Continuation of application No. 17/248,095, filed on Jan. 8, 2021, now Pat. No. 11,457,371.

(51) Int. Cl.
*H04W 24/02* (2009.01)
*H04W 8/00* (2009.01)
(Continued)

(52) U.S. Cl.
CPC .......... *H04W 24/02* (2013.01); *H04W 8/005* (2013.01); *H04W 8/30* (2013.01); *H04W 24/08* (2013.01)

(58) Field of Classification Search
CPC ..... H04W 24/02; H04W 24/08; H04W 8/005; H04W 8/30
(Continued)

(56) References Cited

U.S. PATENT DOCUMENTS

| 8,478,569 B2 | 7/2013 | Scarpelli et al. |
| 9,204,329 B2 | 12/2015 | Boyle et al. |

(Continued)

FOREIGN PATENT DOCUMENTS

EP 3541016 9/2021

OTHER PUBLICATIONS

Lima et al., "Anomaly detection using baseline and K-means clustering", Sep. 1, 2010; SoftCOM 2010, 18th International Conference on Software, Telecommunications and Computer Networks ; 5 pages (Year: 2010).*

*Primary Examiner* — Mong-Thuy T Tran

(57) ABSTRACT

A device may receive network data from base stations associated with a network and may aggregate the network data to generate aggregated network data. The device may remove data that satisfies a threshold from the aggregated network data to generate a reduced set of the aggregated network data. The device may divide the reduced set of the aggregated network data into groups of network factors associated with determining network parameters for the base stations. The device may apply weights to the network factors in the groups of network factors to generate groups of weighted network factors and may generate baselines for the network parameters based on the groups of weighted network factors. The device may compare the network data and the baselines to identify one or more anomalies in the network parameters and may perform one or more actions based on the one or more anomalies.

20 Claims, 10 Drawing Sheets

(51) Int. Cl.
*H04W 8/30* (2009.01)
*H04W 24/08* (2009.01)

(58) Field of Classification Search
USPC .......................................................... 455/419
See application file for complete search history.

(56) References Cited

U.S. PATENT DOCUMENTS

| | | | |
|---|---|---|---|
| 9,866,578 B2 * | 1/2018 | Moore | H04L 63/1416 |
| 9,973,397 B2 | 5/2018 | Hohn et al. | |
| 10,397,810 B2 | 8/2019 | Yang et al. | |
| 10,607,194 B2 | 3/2020 | Fix et al. | |
| 10,779,183 B2 | 9/2020 | Li et al. | |
| 2013/0329588 A1 * | 12/2013 | Sangwan | H04W 24/02 |
| | | | 370/252 |
| 2016/0080965 A1 | 3/2016 | Boyle et al. | |
| 2016/0088006 A1 * | 3/2016 | Gupta | H04L 41/149 |
| | | | 706/12 |
| 2017/0339022 A1 * | 11/2017 | Hegde | H04L 41/06 |
| 2018/0019910 A1 * | 1/2018 | Tsagkaris | H04L 43/0817 |
| 2019/0036789 A1 * | 1/2019 | Kaplunov | G06Q 10/06393 |
| 2021/0029013 A1 * | 1/2021 | Cova | H04L 43/16 |
| 2022/0264331 A1 * | 8/2022 | Arnott | G06N 3/006 |

\* cited by examiner

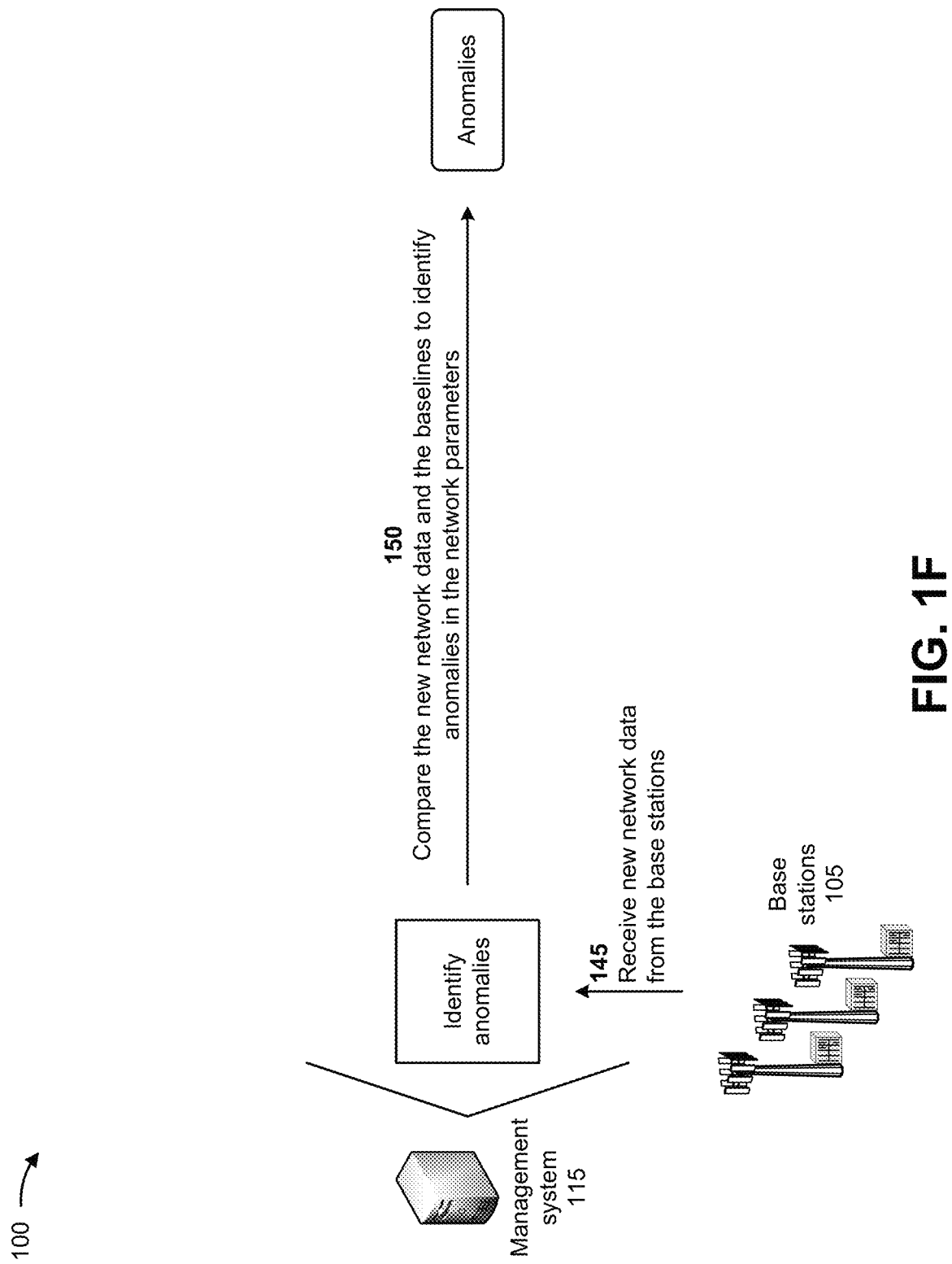

SYSTEMS AND METHODS FOR DETERMINING BASELINES FOR NETWORK PARAMETERS USED TO CONFIGURE BASE STATIONS

RELATED APPLICATION

This application is a continuation of U.S. patent application Ser. No. 17/248,095, entitled "SYSTEMS AND METHODS FOR DETERMINING BASELINES FOR NETWORK PARAMETERS USED TO CONFIGURE BASE STATIONS," filed Jan. 8, 2021, which is incorporated herein by reference in its entirety.

BACKGROUND

A base station (e.g., an eNodeB, a gNodeB, and/or the like) is a hardware component that connects a core network to an end user mobile device (e.g., a user equipment or UE). A base station sends and receives wireless radio transmissions to and from UEs, and controls low-level operation of UEs connected to the base station via a radio access network (RAN).

BRIEF DESCRIPTION OF THE DRAWINGS

FIGS. 1A-1G are diagrams of an example associated with determining baselines for network parameters used to configure base stations.

DETAILED DESCRIPTION OF PREFERRED EMBODIMENTS

Figure 1A:
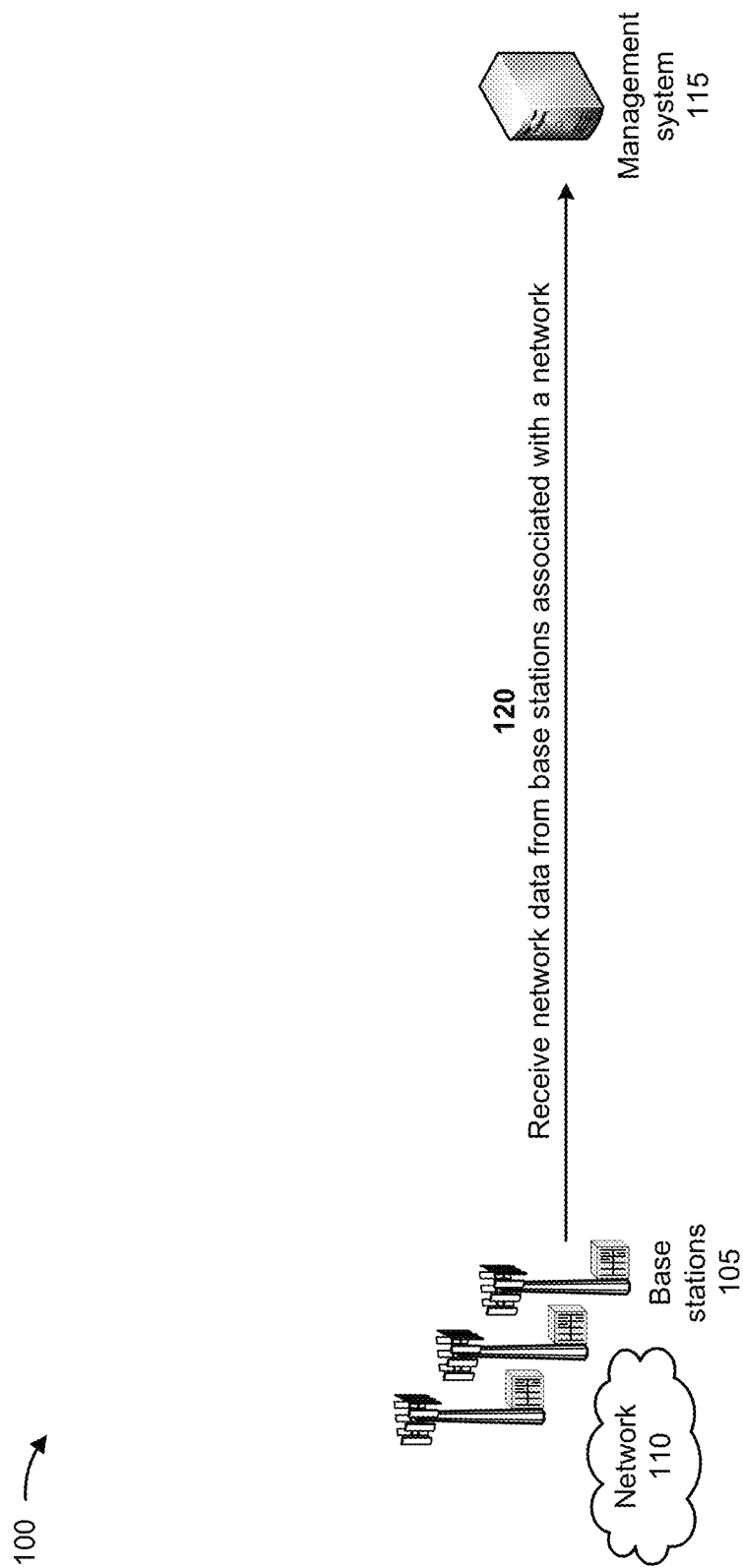

The following detailed description of example implementations refers to the accompanying drawings. The same reference numbers in different drawings may identify the same or similar elements.

A base station houses multiple sector carriers in a single instance and has thousands of network parameters (e.g., managed objects) to be set. Some of the network parameters must be set correctly in order for the network parameters to properly work. Cellular networks associated with base stations utilize such network parameters and require the network parameters to be configured in a particular manner in order to function correctly and provide proper service to end users (e.g., UEs). Due to the volume of network parameters, there is a chance for errors to occur and for un-optimized network parameters to effect network component function, resulting in poor service to be provided to end users. Currently, multiple engineering teams manually check the network parameters to ensure that the network parameters are properly configured. This is a time consuming task that is prone to errors and may result in missed opportunities for correcting and/or optimizing some of the network parameters. Thus, current techniques for inspecting and configuring network parameters waste computing resources (e.g., processing resources, memory resources, communication resources, and/or the like), networking resources, and/or the like associated with base stations operating inefficiently, identifying network parameters causing the base stations to operate inefficiently, attempting to correct the base stations operating inefficiently, and/or the like.

Some implementations described herein provide a management system that determines baselines for network parameters used to configure base stations. For example, the management system may receive network data from base stations associated with a network and may aggregate the network data to generate aggregated network data. The management system may remove data that satisfies a threshold from the aggregated network data, to generate a reduced set of the aggregated network data and may divide the reduced set of the aggregated network data into groups of network factors associated with determining network parameters for the base stations. The management system may apply weights to the network factors in the groups of network factors to generate groups of weighted network factors and may process the groups of weighted network factors to generate baselines for the network parameters. The baseline for a network parameter may correspond to a value to which the network parameter is to be set. The baseline for the network parameter may be dependent upon a profile and/or a version associated with a base station. The management system may compare the network data and the baselines to identify one or more anomalies in the network parameters and may perform one or more actions based on the one or more anomalies.

In this way, the management system determines baselines for network parameters used to configure base stations. The management system automatically reviews all of the network parameters over time, and automatically identifies anomalies associated with one or more of the network parameters. The management system determines corrections to the anomalies, and automatically causes the corrections to be implemented in the base stations. The correct network parameter settings result in an improved customer experience, reduced call drop rates, improved call quality, and reduced network engineering involvement. Thus, the management system conserves computing resources, networking resources, human resources, and/or the like associated with base stations operating inefficiently, identifying network parameters causing the base stations to operate inefficiently, attempting to correct the base stations operating inefficiently, and/or the like.

FIGS. 1A-1G are diagrams of an example 100 associated with determining baselines for network parameters used to configure base stations. As shown in FIGS. 1A-1G, example 100 includes base stations 105 associated with a network 110 and a management system 115. Network 110 may include a RAN associated with a long term evolution (LTE) or fourth generation (4G) network, fifth generation (5G) network, and/or the like. Each base station 105 may include an eNodeB (eNB) capable of transferring traffic, such as audio, video, text, and/or other traffic associated with network 110, a gNodeB (gNB) that supports, for example, a cellular radio access technology (RAT) and wireless communication for network 110, and/or the like. The management system 115 may include a system that determines baselines for network parameters used to configure base stations 105.

As shown in FIG. 1A, and by reference number 120, the management system 115 receives network data from base stations 105 associated with a network 110. The network data received from the base station 105 may include information identifying a group of parameters associated with the base station 105. For example, the network data received from a base station 105 may include a version parameter indicating a version of operating software associated with the base station 105, a parameter associated with the minimum required receiver level in a cell associated with the base station 105 (e.g., qrxlevmin), a parameter associated with a threshold for inter radio access technology (IRAT) frequency (e.g., sNonIntraSearch), and/or the like. The management system 115 may query a base station 105 and may receive network data associated with the base station 105 in response to the query. The management system 115 may query and/or obtain network data from each base station included in the network 110.

In some implementations, the management system 115 converts the network data into a standardized format. For example, the management system 115 may receive data from a plurality of base stations 105 in a plurality of different formats. The management system 115 may convert the network data into a common format. For example, a plurality of different base stations may use a plurality of different identifiers that refer to a single parameter related to network data. The management system 115 may convert the plurality of different identifiers into a single, common identifier associated with the single parameter.

In some implementations, the management system 115 analyzes the network data to identify parameters included in the network data. The management system 115 may assign classifications to the identified parameters. For example, the management system 115 may classify a parameter as a label, an identifier, a RAN parameter (e.g., a parameter associated with configuring the RAN), a profile parameter (e.g., a parameter having a value dependent upon a profile (e.g., a profile associated with a base station 105 located in a rural area, a profile associated with a base station 105 located in an urban area, a profile associated with a base station 105 located in a dense urban area, a base station 105 having a first configuration, a base station 105 having a second configuration, and/or another type of profile) associated with the base station 105), a version parameter indicating a version of software associated with a base station 105, a global parameter (e.g., a parameter having a value that is not dependent upon a profile associated with the base station 105), and/or the like.

As an example, the network data may include first network data received from a particular base station 105. The first network data may include an identifier associated with the particular base station 105, a first parameter identifying a version of software associated with the particular base station 105, a second parameter identifying a profile associated with the base station 105, a qrxlevmin parameter, and a snonintrasearch parameter. The management system 115 may classifier the identifier as an identifier. The management system 115 may classify the first parameter as a version parameter based on the first parameter identifying the version of software associated with the particular base statin 105. The management system 115 may classify the second parameter as a profile parameter based on the second parameter identifying the profile associated with the particular base station 105. The management system 115 may classify the qrxlevmin parameter as a global parameter and/or a parameter that is not dependent upon a profile associated with the particular base station 105 based on the qrxlevmin parameter indicating a minimum required receiver level in a cell associated with the particular base station 105. The management system 115 may classify the snonintrasearch parameter as a version parameter and/or a profile parameter based on a value of the snonintrasearch parameter being dependent upon a version of software associated with the particular base station 105 and/or a profile associated with the particular base station 105.

Figure 1B:
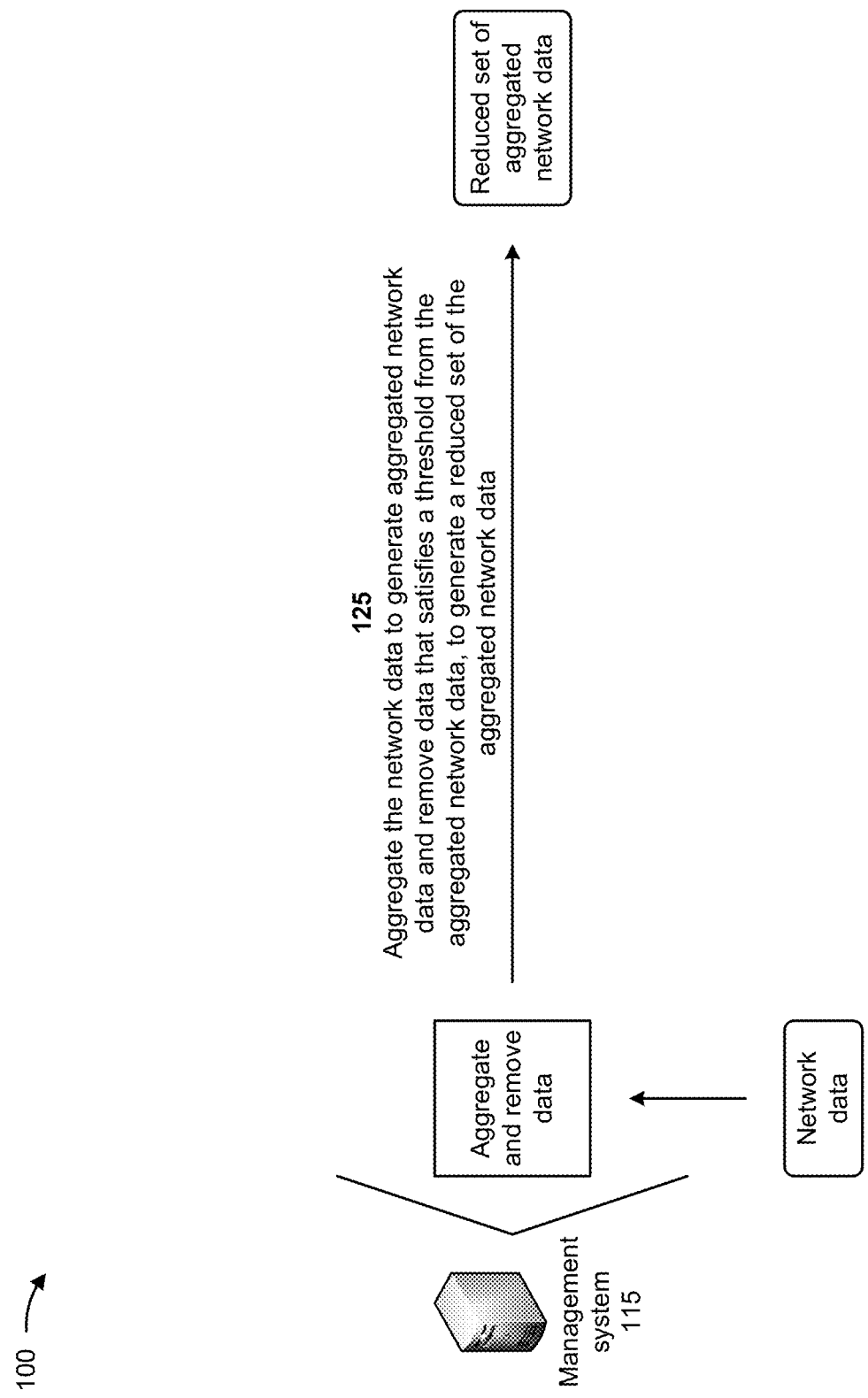

As shown in FIG. 1B, and by reference number 125, the management system 115 aggregates the network data to generate aggregated network data and removes data that satisfies a threshold from the aggregated network data, to generate a reduced set of the aggregated network data. The management system 115 may aggregate the network data to enable the management system 115 to process network data associated with respective parameters, as described in greater detail below. To aggregate the network data, initially, the management system 115 may generate a master list of parameters. The master list of parameters may include a respective list of parameters and values of the parameters received from each base station 105. Each parameter, included in the master list of parameters, may be associated with profile data associated with the base station 105 from which the parameter was received. The profile data may include information identifying a profile associated with the base station 105, a hardware configuration associated with the base station 105, a software configuration associated with the base station 105, and/or the like.

As an example of generating the master list of parameters, the network data may include first network data received from a first base station 105 and second network data received from a second base station 105. The first network data may include a first parameter having a first value and a second parameter having a second value. The second network data may include the first parameter having the first value and the second parameter having a third value. The master list of parameters may include a first entry, a second entry, a third entry, and a fourth entry. The first entry may include information identifying the first parameter, the first value, and profile data associated with the first base station 105. The second entry may include information identifying the second parameter, the second value, and the profile data associated with the first base station. The third entry may include information identifying the first parameter, the first value, and profile information associated with the second base station 105. The fourth entry may include information identifying the second parameter, the third value, and the profile data associated with the second base station 105.

The management system 115 may divide the processing of the network data into a plurality of processing threads. Each thread, of the plurality of processing threads, may include a current value of the network data and profile data. The device may normalize the plurality of processing threads to generate the aggregated network data.

As an example, the first processing thread may process data included in the master list and associated with the first parameter to generate first parameter information and second parameter information. The first parameter information may include information identifying a first parameter, a first value of the first parameter, a first profile identifier indicating a first profile of a base station 105, and a percentage of base stations 105 associated with the first profile that have the first parameter set to the first value. The second parameter information may include information identifying the first parameter, a second value of the first parameter, the first profile identifier, and a percentage of the base stations 105 associated with the first profile that have the first parameter set to the second value. The management system 115 may normalize the data generated by the plurality of processing threads to generate the aggregated network data.

The management system 115 may remove, from the threaded data, a group of parameters to generate a reduced set of aggregated network data. In some implementations, the management system 115 removes parameters having values of no value and/or unrelated to the configuration of the base station 105 and/or the network. For example, the management system 115 may remove parameters classified as labels, parameters classified as identifiers, IP addresses, backhaul configuration parameters, and/or the like from the aggregated data to generate a reduced set of aggregated network data.

Alternatively, and/or additionally, the management system 115 removes a group of parameters based on a percentage of base stations 105 having the group of parameters set to a common value. The management system 115 may determine whether a percentage of base stations 105 having the parameter set to a particular value satisfies a criteria (e.g., a threshold greater than 99%, 98%, 95%, and/or the like). The management system 115 may remove data associated with the parameter from the aggregated data when the percentage of base stations 105 having the parameter set of the particular value satisfies the criteria (e.g., is less than the established threshold value).

Figure 1C:
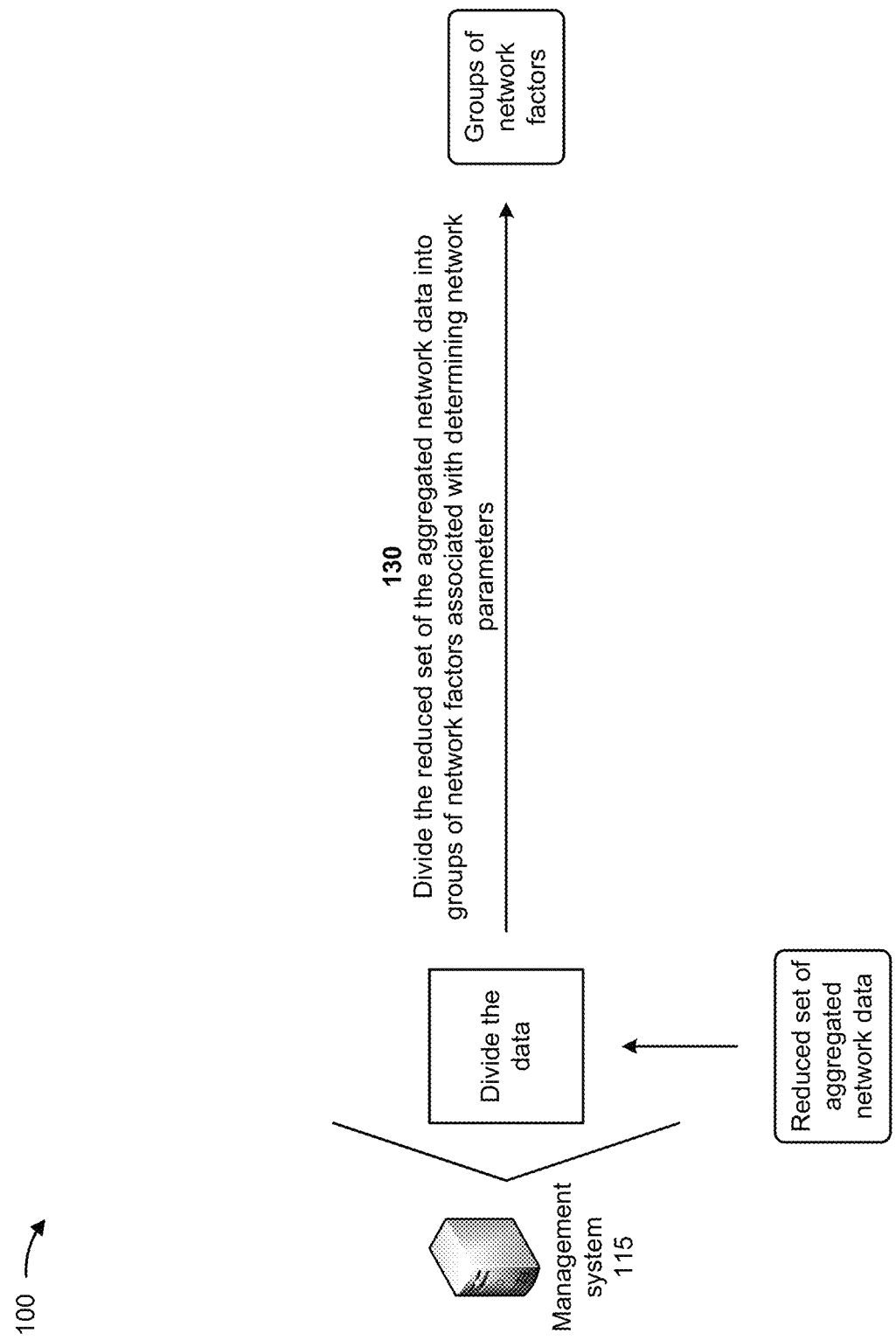

As shown in FIG. 1C, and by reference number 130, the management system 115 divides the reduced set of the aggregated network data into groups of network factors associated with determining network parameters. The network factors may include a profile associated with one or more of the base stations 105, a version of software associated with one or more of the base stations 105, a hardware configuration associated with one or more of the base stations 105, a software configuration associated with one or more of the base stations 105, a performance indicator associated with one or more of the base stations 105, geographic information associated with one or more of the base stations 105, and/or the like. In some implementations, the management system 115 divides the aggregated network data into groups based on a single network factor. For example, the management system 115 may divide the aggregated network data into groups based on one or more profiles associated with the base stations 105 (e.g., a first group of aggregated network data including network data associated with base stations 105 associated with a first profile, a second group of aggregated network data including network data associated with base stations 105 associated with a second profile, and/or the like).

Alternatively, and/or additionally, the management system 115 may divide the aggregated network data into groups based on a plurality of network factors. For example, the management system 115 may divide the aggregated network data into groups based on a profile and a version of software associated with the base stations 105 (e.g., a first group aggregated network data including network data associated with base stations 105 associated with a first profile and a first version of software, a second group of aggregated network data including network data associated with base stations 105 associated with the first profile and a second version of software, and/or the like).

The management system 115 may determine the network factors based on the profile data associated with the parameters. The management system 115 may divide the reduced set of aggregated network data into the groups of network factors to group parameters of base stations 105 associated with similar operating conditions, hardware configurations, software configurations, geographic locations (e.g., base stations 105 located in urban areas, base stations 105 located in rural areas), and/or the like.

Figure 1D:
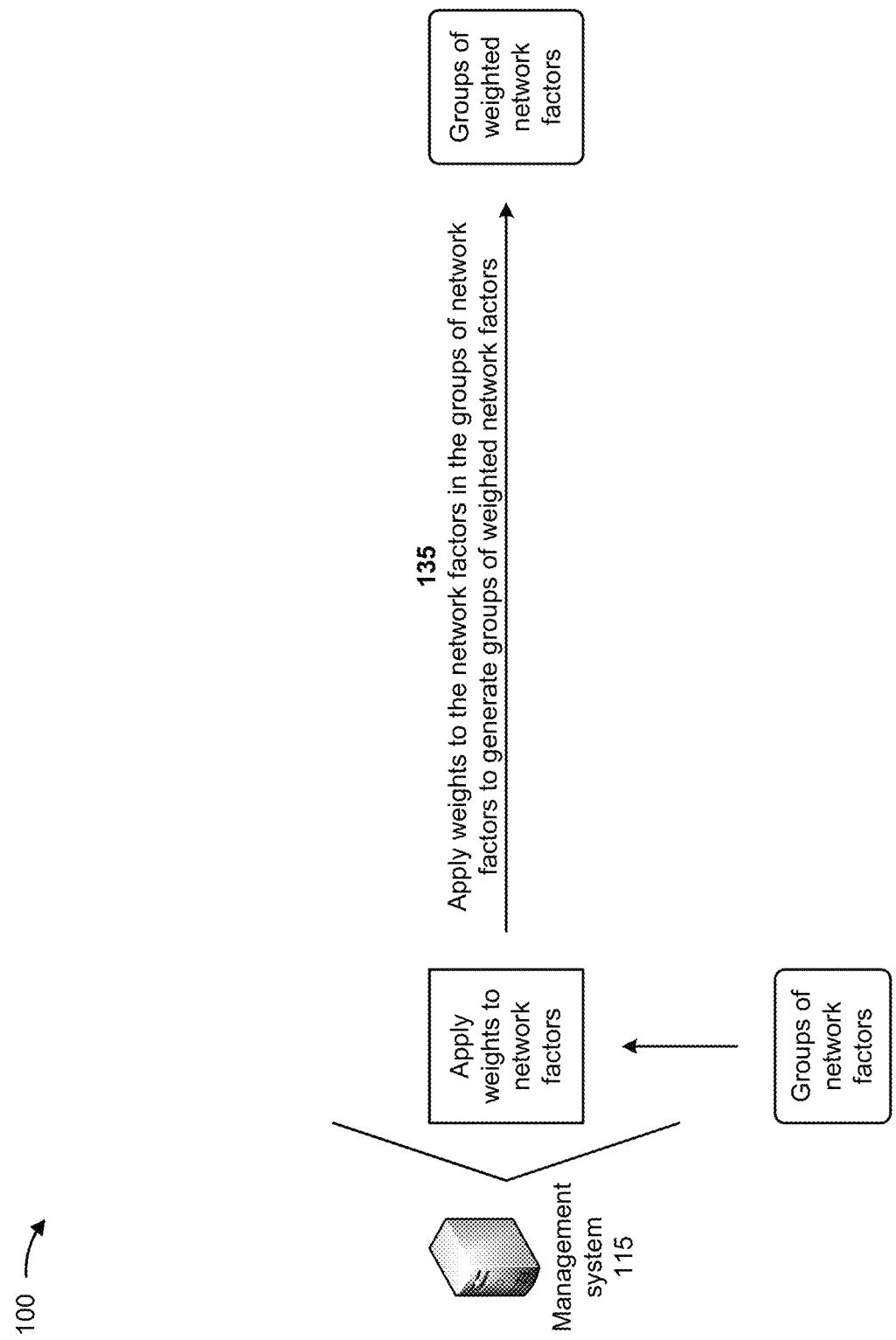

As shown in FIG. 1D, and by reference number 135, the management system 115 applies weights to the network factors in the groups of network factors to generate groups of weighted network factors. The management system 115 may apply weights to the network factors based on a quantity of base stations 105 associated with the network factors, a population density associated with base stations 105 associated with the network factors, a frequency band associated with the base stations 105 associated with the network factors, and/or the like.

Figure 1E:
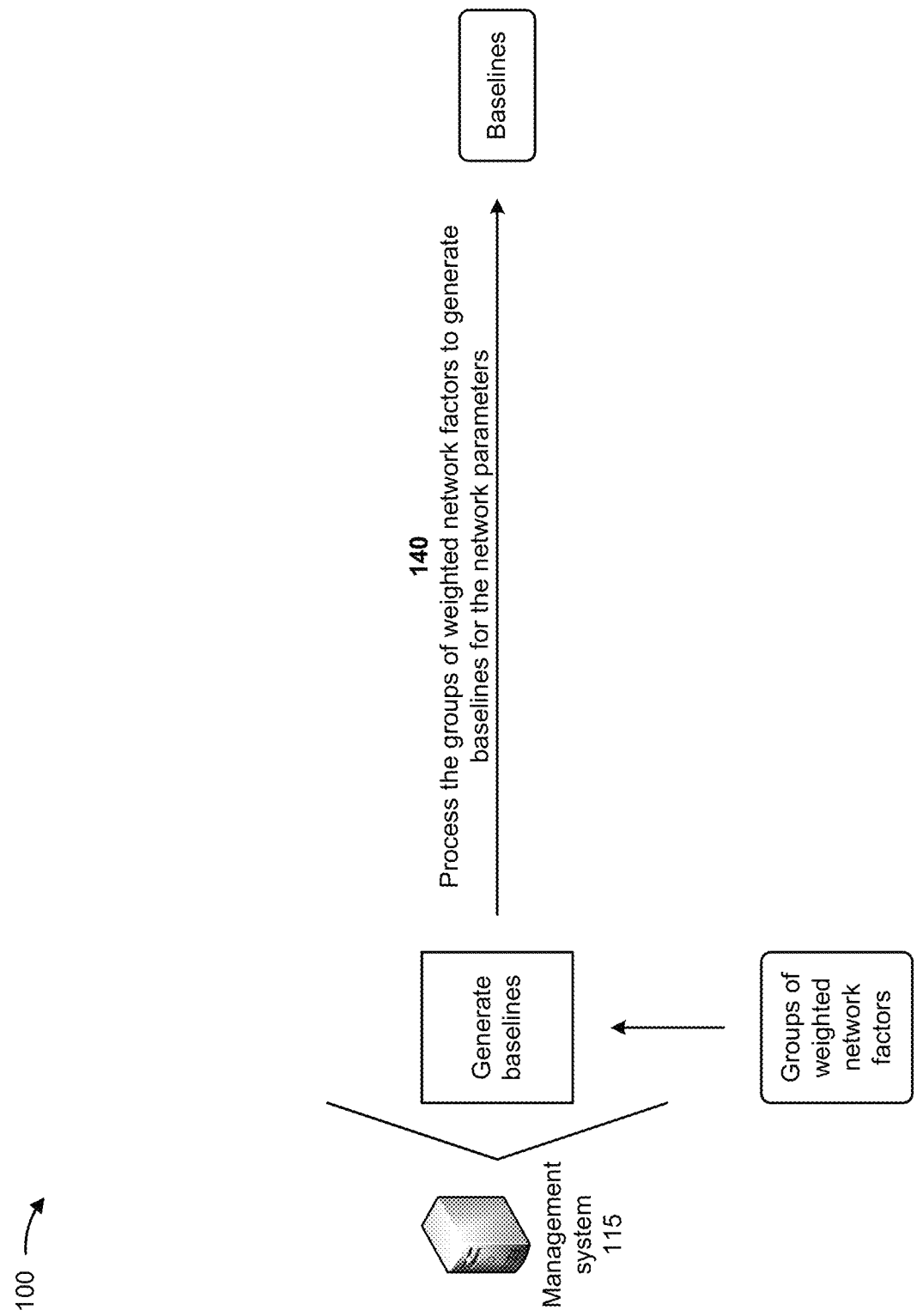

As shown in FIG. 1E, and by reference number 140, the management system 115 processes the groups of weighted network factors to generate baselines for the network parameters. The management system 115 may utilize a model to process the groups of weighted network factors. The management system 115 may also utilize a model to perform a population analysis to identify commonalities within the groups of weighted network factors, to identify anomalies within the groups of weighted network factors, and to classify the identified anomalies. The management system 115 may generate the baselines for the network parameters based on the identified commonalities and the classified anomalies.

In some implementations, the management system 115 utilizes a plurality of models to process the groups of weighted network factors. Each model, of the plurality of models, may be associated with a respective group of network factors. A model, of the plurality of models, may be associated with a group of network factors and may be trained based on historical network data associated with the group of network factors.

As an example, the management system 115 may process a group of weighted network factors and may determine that a threshold percentage (e.g., 99%) of base stations 105 associated with the group of weighted network factors have a first parameter (e.g., qrxlevmin) set to a first value (e.g., −120) and that the remaining base stations 105 associated with the group of weighted network factors have the first parameter set to a second value (e.g., −122). The management system 115 may generate a baseline for the first parameter corresponding to the first value and/or may classify the second value as an anomaly based on the threshold percentage of base stations 105 having the first parameter set to the first value.

The management system 115 may determine that less than a threshold percentage of base stations 105 associated with the group of weighted network factors have a second parameter (e.g., snonintrasearch) set to a first value (e.g., 8) and that the remaining base stations 105 associated with the group of weighted network factors have the second parameter set to a second value (e.g., 37). The management system 115 may determine not to generate a baseline for the second parameter corresponding to the first value and/or may determine not to classify the second value as an anomaly based on less than the threshold percentage of base stations 105 having the second parameter set to the first value. In this way, the model may be trained to determine baselines for network parameters for base stations 105 associated with a particular group of network factors, rather than determining a common set of baselines for all the base stations 105 included in the network.

The management system 115 may query the base stations 105 based on generating the baselines for network parameters. The base stations 105 may provide the new network parameters to the management system 115 based on receiving the query. As shown in FIG. 1F, and by reference number 145, the management system 115 receives the new network data from the base stations 105.

As shown by reference number 150, the management system 115 compares the new network data and the baselines to identify anomalies in the network parameters. The management system 115 may determine whether values associated with the network data substantially match values associated with the baselines. For example, the management system 115 may determine that the values associated with the network data substantially match the values associated with the baselines when the values associated with the network data are the same as the values associated with the baselines, when a difference between the values associated with the network data and the values associated with the baselines satisfies a criteria (e.g., satisfies a threshold, fails to satisfy a threshold, and/or satisfies another type of criteria), and/or the like. The management system 115 may identify the one or more anomalies in the network parameters when the values associated with the network data fail to substantially match the values associated with the baselines.

In some implementations, the management system 115 determines whether one of the anomalies is to be applied as a new baseline for the network parameters. The management system 115 may determine whether the anomaly is a result of a self-optimizing network (SON) process that automatically adjusts network parameters. The management system 115 may determine that the anomaly is to be applied as a new baseline for the network parameters when the anomaly is the result of a SON process. The management system 115 may add the new baseline to the baselines based on determining that the anomaly is to be applied as the new baseline.

In some implementations, the management system 115 determines a network parameter correction for the anomaly. For example, the management system 115 may determine the network parameter correction based on a baseline for a parameter associated with the anomaly. The management system 115 may cause the network parameter correction to be implemented in the base station 105 associated with the anomaly.

Figure 1G:
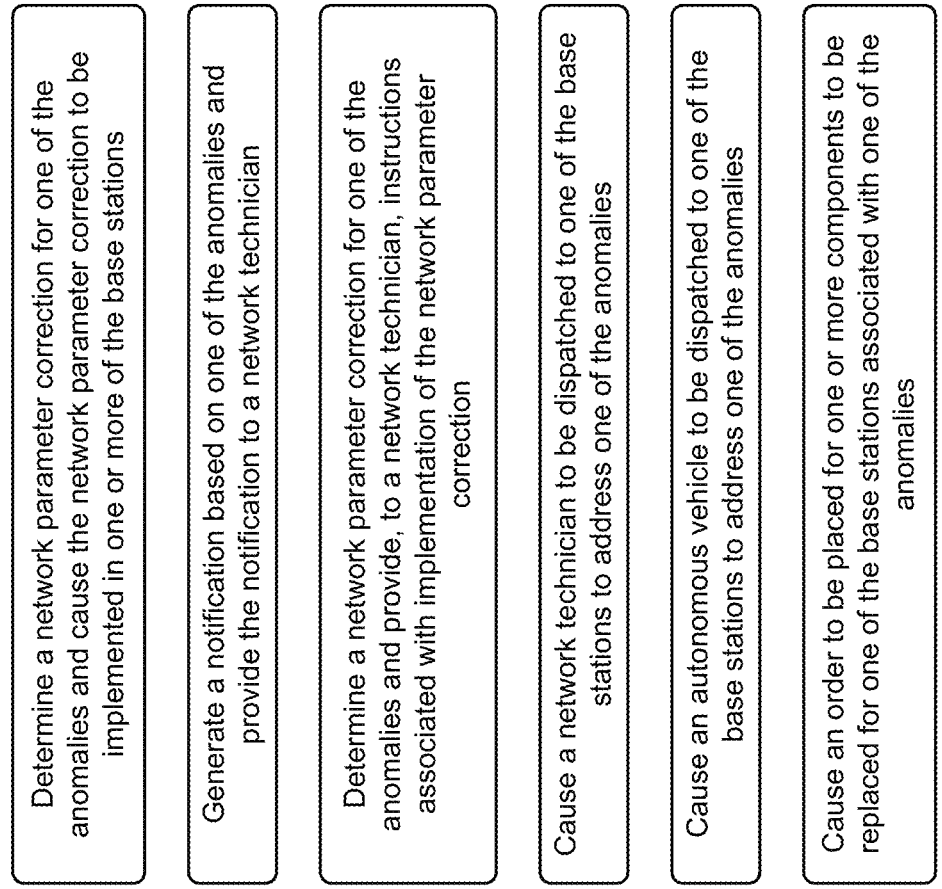

As shown in FIG. 1G, and by reference number 155, the management system 115 performs one or more actions based on the anomalies. In some implementations, the one or more actions include the management system 115 determining a network parameter correction for one of the anomalies and causing the network parameter correction to be implemented in one or more of the base stations 105. For example, the management system 115 may determine that a value of a network parameter associated with an anomaly is to be set to a value indicated by the baseline. The management system 115 may provide information identifying the network parameter and the value indicated by the baseline to the one or more of the base stations 105 to cause the one or more of the base stations 105 to set the value of the parameter to the value indicated by the baseline.

In some implementations, the one or more actions include the management system 115 generating a notification based on the one or more anomalies and providing the notification to a network technician. For example, the management system 115 may generate a notification that includes information identifying a base station 105 associated with an anomaly, a network parameter associated with the anomaly, a current value of the network parameter, a value of the network parameter to which the network parameter should be set, and/or the like. The management system 115 may provide the notification to a user device (e.g., a computer, a laptop, a smart phone, a tablet, and/or the like) associated with a network technician. In some implementations, the management system 115 provides the notification to the user device to cause the network technician to set the value of the network parameter to the value indicated in the notification. Alternatively, and/or additionally, the management system 115 may provide the notification to cause the network technician to input, via the user device, a correction to the network parameter, information indicating whether the anomaly is to be applied as a baseline for the network parameter, and/or the like.

In some implementations, the one or more actions include the management system 115 determining a network parameter correction for one of the anomalies and providing, to a network technician, instructions associated with implementation of the network parameter correction. For example, the management system 115 may include instructions associated with implementation of the network parameter in the notification generated and provided to the network technician, as described above.

In some implementations, the one or more actions include the management system 115 causing a network technician to be dispatched to one of the base stations 105 to address one of the anomalies. The management system 115 may generate a notification that includes information identifying a base station 105 associated with an anomaly, information identifying a location of the base station 105, information associated with an anomaly associated with the base station 105, and/or the like. The management system 115 may provide the notification to a user device associated with a network technician to cause the network technician to be dispatched to the base station 105.

In some implementations, the one or more actions include the management system 115 causing an order to be placed for one or more components to be replaced for one of the base stations 105 associated with one of the anomalies. For example, the management system 115 may determine that the anomaly indicates a failure of a component of a base station 105 associated with the anomaly. The management system 115 may provide information identifying the component, information identifying the base station 105, information identifying the anomaly, information supporting a decision to replace the component (e.g., information indicating that the current value of a network parameter associated with the anomaly commonly occurs as a result of a failure of the component), and/or information indicating that the component is to be replaced to a device associated with ordering components for the base station 105, an employee associated with ordering components for the base station 105, a network technician associated with replacing the component, and/or the like.

In this way, the management system determines baselines for network parameters used to configure base stations. The management system automatically reviews the network parameters over time, and automatically identifies anomalies associated with one or more of the network parameters. The management system determines corrections to the anomalies, and automatically causes the corrections to be implemented in the base stations. The correct network parameter settings result in an improved customer experience, reduced drop call rates, improved call quality, and reduced network engineering involvement. Thus, the management system conserves computing resources, networking resources, human resources, and/or the like associated with base stations operating inefficiently, identifying network parameters causing the base stations to operate inefficiently, attempting to correct the base stations operating inefficiently, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
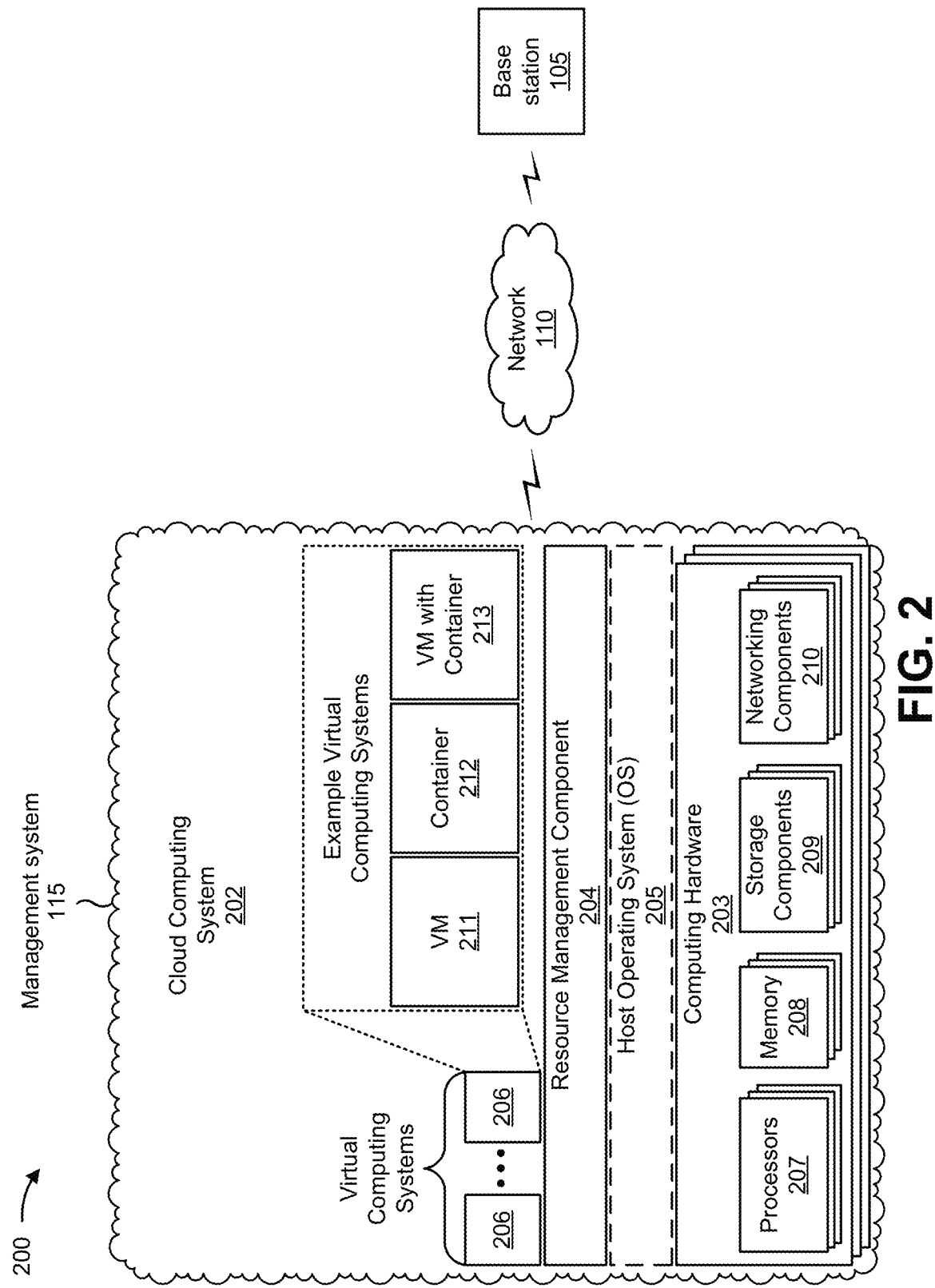
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include management system 115, which may include one or more elements of and/or may execute within a cloud computing system 202. The cloud computing system 202 may include one or more elements 203-213, as described in more detail below. As further shown in FIG. 2, environment 200 may include base station 105 and/or network 110. Devices and/or elements of environment 200 may interconnect via wired connections and/or wireless connections. Some implementations are described herein as being performed within an LTE network for explanatory purposes. Some implementations may be performed within a network that is not an LTE network, such as a third generation (3G) network, a 5G network, and/or the like.

Base station 105 includes one or more devices capable of transferring traffic, such as audio, video, text, and/or other traffic, destined for and/or received from a UE. For example, base station 105 may include an eNB associated with an LTE network that receives traffic from and/or sends traffic to a core network, a gNB associated with a RAN of a 5G network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication.

Network 110 may include a RAN that includes one or more base stations 105 that take the form of eNBs, gNBs, and/or the like, via which a user device (e.g., a mobile phone, a laptop computer, a tablet computer, a desktop computer, and/or the like) communicates with a core network. Network 110 may include one or more wired and/or wireless networks. For example, network 110 may include a cellular network (e.g., a 5G network, an LTE network, a 3G network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although management system 115 may include one or more elements 203-213 of the cloud computing system 202, may execute within the cloud computing system 202, and/or may be hosted within the cloud computing system 202, in some implementations, management system 115 may not be cloud-based (e.g., may be implemented outside of a cloud computing system) or may be partially cloud-based. For example, management system 115 may include one or more devices that are not part of the cloud computing system 202, such as device 300 of FIG. 3, which may include a stand-alone server or another type of computing device. Management system 115 may perform one or more operations and/or processes described in more detail elsewhere herein, such as for management system 115.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
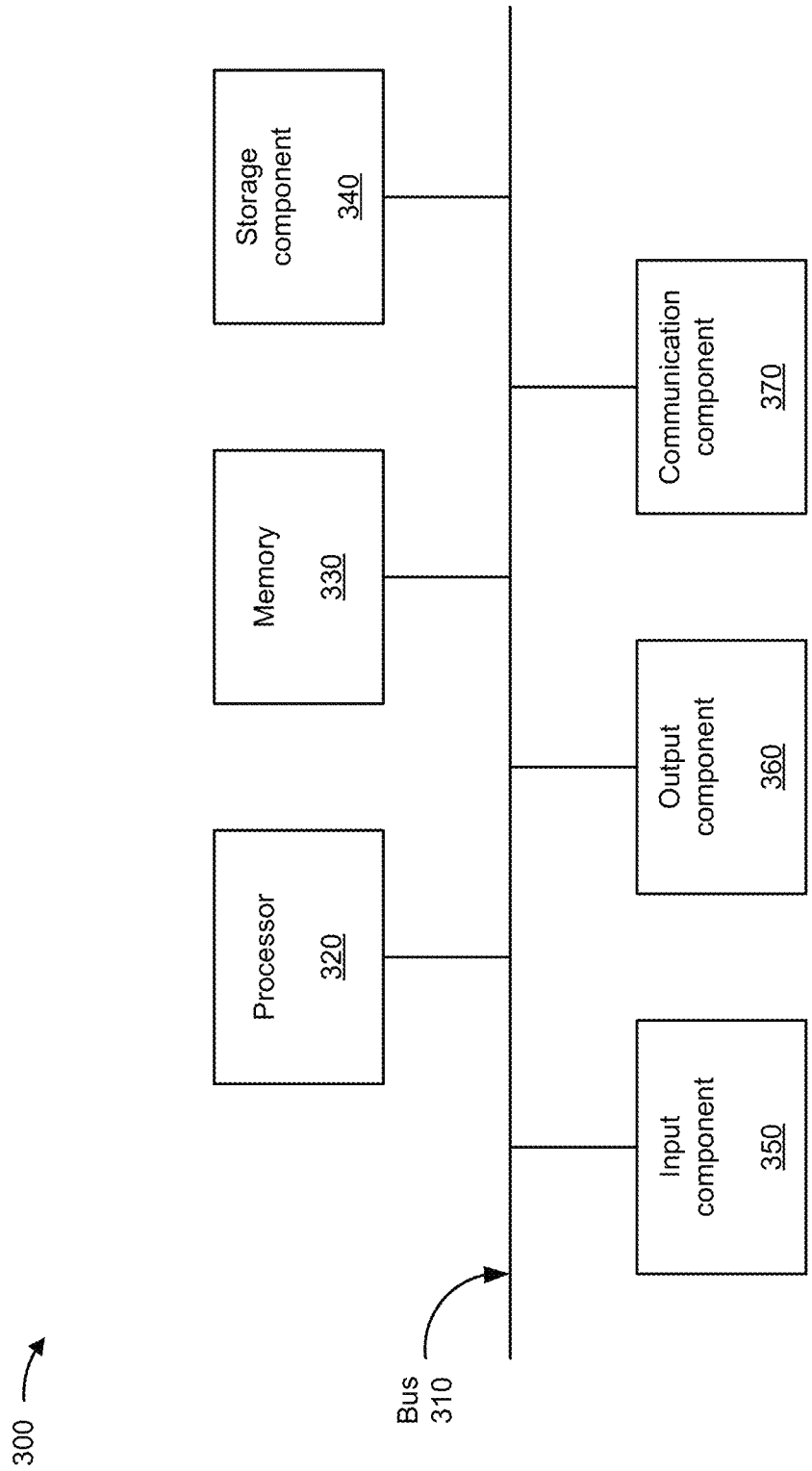
FIG. 3 is a diagram of example components of one or more devices of FIG. 2.

FIG. 3 is a diagram of example components of a device 300, which may correspond to base station 105 and/or management system 115. In some implementations, base station 105 and/or management system 115 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
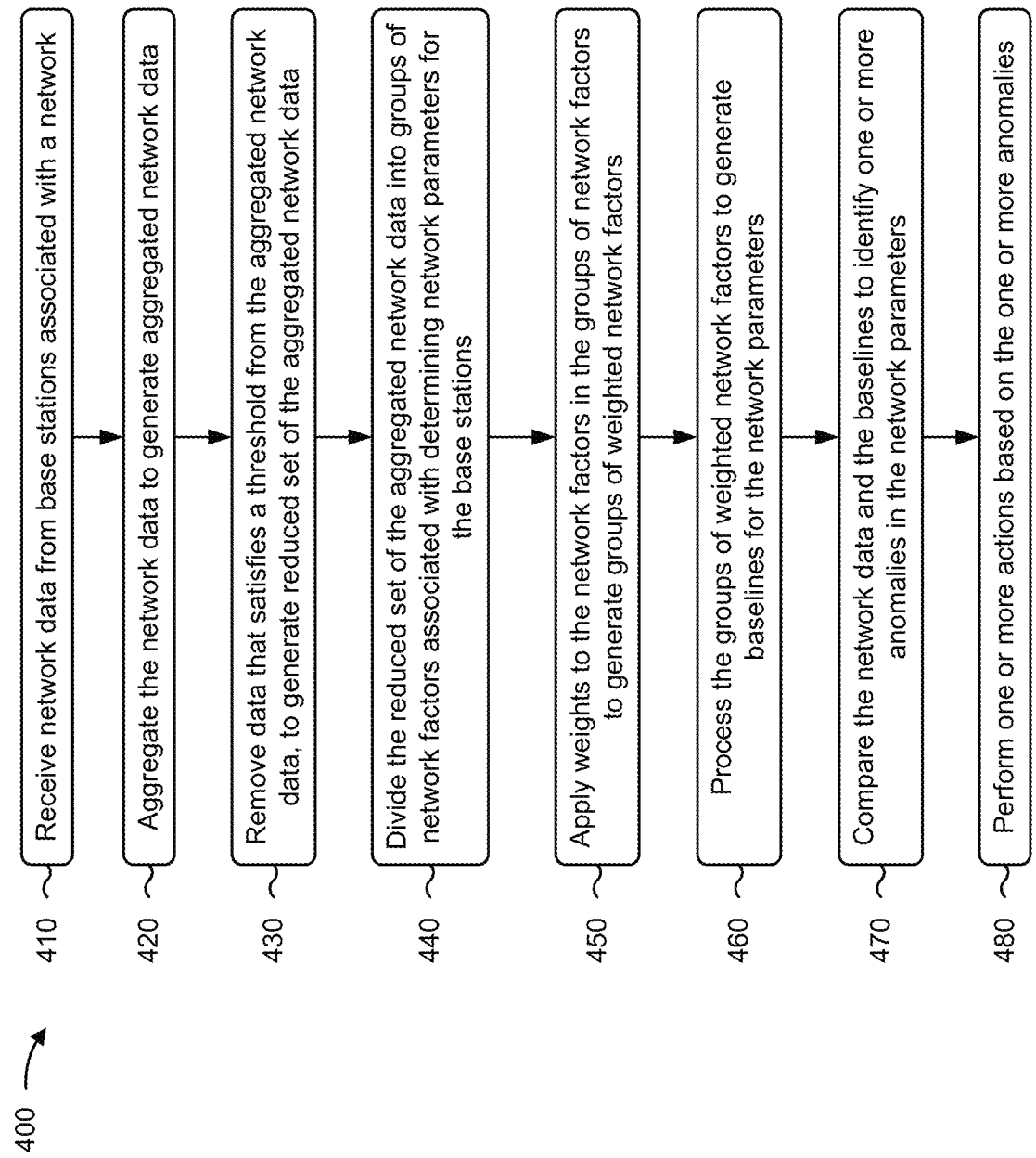
FIG. 4 is a flowchart of an example process relating to determining baselines for network parameters used to configure base stations.

FIG. 4 is a flowchart of an example process 400 associated with determining baselines for network parameters used to configure base stations. In some implementations, one or more process blocks of FIG. 4 may be performed by a device (e.g., management system 115). In some implementations, one or more process blocks of FIG. 4 may be performed by another device or a group of devices separate from or including the device, such as a base station (e.g., base station 105). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving network data from base stations associated with a network (block 410). For example, the device may receive network data from base stations associated with a network, as described above.

As further shown in FIG. 4, process 400 may include aggregating the network data to generate aggregated network data (block 420). For example, the device may aggregate the network data to generate aggregated network data, as described above. When aggregating the network data, the device may divide processing of the network data into a plurality of threads. Each thread, of the plurality of threads, may include a current value of the network data and profile data. The device may normalize the plurality of threads to generate the aggregated network data.

As further shown in FIG. 4, process 400 may include removing data that satisfies a threshold from the aggregated network data, to generate a reduced set of the aggregated network data (block 430). For example, the device may remove data that satisfies a threshold from the aggregated network data, to generate a reduced set of the aggregated network data, as described above.

As further shown in FIG. 4, process 400 may include dividing the reduced set of the aggregated network data into groups of network factors associated with determining network parameters for the base stations (block 440). For example, the device may divide the reduced set of the aggregated network data into groups of network factors associated with determining network parameters for the base stations, as described above. The network factors may include a hardware configuration associated with one or more of the base stations, a software configuration associated with one or more of the base stations, a performance indicator associated with one or more of the base stations, and/or geographic information associated with one or more of the base stations.

As further shown in FIG. 4, process 400 may include applying weights to the network factors in the groups of network factors to generate groups of weighted network factors (block 450). For example, the device may apply weights to the network factors in the groups of network factors to generate groups of weighted network factors, as described above.

As further shown in FIG. 4, process 400 may include processing the groups of weighted network factors to generate baselines for the network parameters (block 460). For example, the device may process the groups of weighted network factors to generate baselines for the network parameters, as described above.

As further shown in FIG. 4, process 400 may include comparing the network data and the baselines to identify one or more anomalies in the network parameters (block 470).

For example, the device may compare the network data and the baselines to identify one or more anomalies in the network parameters, as described above. When comparing the network data and the baselines to identify the one or more anomalies in the network parameters, the device may determine whether values associated with the network data substantially match values associated with the baselines. The device may identify the one or more anomalies in the network parameters when the values associated with the network data fail to substantially match the values associated with the baselines.

In some implementations, the device may determine whether one of the one or more anomalies is to be applied as a new baseline for the network parameters. The device may identify the one of the one or more anomalies as an anomaly when the one of the one or more anomalies is not to be applied as the new baseline. The device may add the new baseline to the baselines when the one of the one or more anomalies is to be applied as the new baseline. For example, the device may provide information identifying the one or more anomalies to a user via a user interface associated with the device. The user may input, via the user interface, information indicating whether the one or more anomalies are to be applied as a baseline for a network parameter. The device may add the one or more anomalies to the baselines as a new baseline and/or remove the one or more anomalies from the baselines based on the information input by the user.

As further shown in FIG. 4, process 400 may include performing one or more actions based on the one or more anomalies (block 480). For example, the device may perform one or more actions based on the one or more anomalies, as described above. In some implementations, when performing the one or more actions, the device may determine a network parameter correction for one of the one or more anomalies and may cause the network parameter correction to be implemented in one or more of the base stations. Alternatively, and/or additionally, when performing the one or more actions, the device may generate a notification based on one of the one or more anomalies and may provide the notification to a network technician.

In some implementations, when performing the one or more actions, the device may determine a network parameter correction for one of the one or more anomalies and may provide, to a network technician, instructions associated with implementation of the network parameter correction. In some implementations, the device may cause a network technician to be dispatched to one of the base stations to address one of the one or more anomalies; may cause an autonomous vehicle to be dispatched to one of the base stations to address one of the one or more anomalies; and/or may cause an order to be placed for one or more components to replace for one of the base stations associated with one of the one or more anomalies.

In some implementations, the device may receive new network data from the base stations. The device may compare the new network data and the baselines to identify another one or more anomalies in the network parameters. The device may perform another one or more actions based on the other one or more anomalies. For example, the device may determine a network parameter correction for one of the one or more anomalies and cause the network parameter correction to be implemented in one or more of the base stations; generate a notification based on one of the one or more anomalies and provide the notification to a network technician; and/or determine another network parameter correction for another one of the one or more anomalies and provide, to the network technician, instructions associated with implementation of the other network parameter correction. Alternatively, and/or additionally, the device may cause a network technician to be dispatched to one of the base stations to address one of the one or more anomalies; cause an autonomous vehicle to be dispatched to one of the base stations to address one of the one or more anomalies; and/or cause an order to be placed for one or more components to replace for one of the base stations associated with one of the one or more anomalies.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   removing, by a device, data that satisfies a threshold from aggregated network data to generate a reduced set of the aggregated network data;
   dividing, by the device, the reduced set of the aggregated network data into groups of network factors;
   applying, by the device, weights to network factors in the groups of network factors to generate groups of weighted network factors;
   generating, by the device, baselines for network parameters based on the groups of weighted network factors; and
   determining, by the device, one or more anomalies associated with the baselines,
      wherein determining the one or more anomalies comprises:
         determining the one or more anomalies based on whether values associated with the aggregated network data substantially match values associated with the baselines.

2. The method of claim 1, further comprising:
   determining whether the one or more anomalies are to be applied as a new baseline for the network parameters.

3. The method of claim 1, further comprising:
   classifying one or more other anomalies associated with the groups of weighted network factors; and
   wherein generating the baselines comprises:
      generating the baselines based on classifying the one or more other anomalies.

4. The method of claim 1, wherein the groups of network factors include a profile associated with one or more base stations.

5. The method of claim 1, wherein the weights are associated with one or more of:
   a quantity of base stations associated with the network factors,
   a population density associated with the base stations, or
   a frequency band associated with the base stations.

6. The method of claim 1, further comprising:
   using a model to perform a population analysis to identify commonalities within the groups of weighted network factors; and
   wherein generating the baselines comprises:
      generating the baselines based on the commonalities.

7. The method of claim 1, further comprising:
   using a plurality of models to process the groups of weighted network factors; and
   determining to generate the baselines based on processing the groups of weighted network factors.

8. A non-transitory computer-readable medium storing a set of instructions, the set of instructions comprising:
   one or more instructions that, when executed by one or more processors of a device, cause the device to:
      remove data that satisfies a threshold from aggregated network data to generate a reduced set of the aggregated network data;
      divide the reduced set of the aggregated network data into groups of network factors;
      apply weights to network factors in the groups of network factors to generate groups of weighted network factors;
      use a model to perform a population analysis to identify commonalities within the groups of weighted network factors;
      generate baselines for network parameters based on the groups of weighted network factors and based on the commonalities; and
      determine one or more anomalies associated with the baselines.

9. The non-transitory computer-readable medium of claim 8, wherein the aggregated network data is aggregated based on a master list of parameters,
   wherein the master list of parameters includes a respective list of parameters and values of parameters received from each base station associated with the aggregated network data.

10. The non-transitory computer-readable medium of claim 8, wherein the one or more instructions further cause the device to:
    divide network data into a plurality of threads; and
    normalize the plurality of threads to generate the aggregated network data.

11. The non-transitory computer-readable medium of claim 8, wherein the one or more instructions further cause the device to:
    remove, from the aggregated network data, a group of parameters,
       wherein the parameters have values of no value or are unrelated to configuration of base stations associated with the aggregated network data.

12. The non-transitory computer-readable medium of claim 8, wherein the one or more instructions further cause the device to:
    remove, from the aggregated network data, a group of parameters, based on a percentage of base stations, associated with the aggregated network data, having the group of parameters set to a common value.

13. The non-transitory computer-readable medium of claim 8, wherein the network factors include one or more of:
    a profile associated with one or more base stations associated with the aggregated network data,
    a version of software associated with the one or more base stations,
    a hardware configuration associated with the one or more base stations, a software configuration associated with the one or more base stations, a performance indicator associated with the one or more base stations, or geographic information associated with the one or more base stations.

14. A device, comprising:

one or more processors configured to:
    remove, from aggregated network data, a group of parameters,
        wherein the parameters have values of no value or are unrelated to configuration of base stations associated with the aggregated network data;
    remove data that satisfies a threshold from the aggregated network data to generate a reduced set of the aggregated network data;
    divide the reduced set of the aggregated network data into groups of network factors;
    apply weights to network factors in the groups of network factors to generate groups of weighted network factors;
    generate baselines for network parameters based on the groups of weighted network factors; and
    determine one or more anomalies associated with the baseline.

15. The device of claim 14, wherein the one or more processors, to determine the one or more anomalies, are configured to:
    determine the one or more anomalies based on whether values associated with the aggregated network data substantially match values associated with the baselines.

16. The device of claim 14, wherein the one or more processors are further configured to:
    cause a network technician to be dispatched to address one of the one or more anomalies;
    cause an autonomous vehicle to be dispatched to address one of the one or more anomalies; or
    cause an order to be placed for one or more components to replace for a base station associated with one of the one or more anomalies.

17. The device of claim 14, wherein the one or more processors are further configured to:
    determine a network parameter correction for one of the one or more anomalies; and
    cause the network parameter correction to be implemented in one or more base stations.

18. The device of claim 14, wherein the one or more processors are further configured to:
    generate a notification based on one of the one or more anomalies; and
    provide the notification to a network technician.

19. The device of claim 14, wherein the one or more processors are further configured to:
    determine whether one of the one or more anomalies is to be applied as a new baseline for the network parameters; and
    add the new baseline to the baselines when the one of the one or more anomalies is to be applied as the new baseline.

20. The device of claim 14, wherein the one or more processors, to generate the baselines, are configured to:
    generate baselines based on utilizing a model to perform a population analysis.

* * * * *